(12) United States Patent
Lee et al.

(10) Patent No.: US 7,776,979 B2
(45) Date of Patent: Aug. 17, 2010

(54) PREPOLYMERIZED CATALYST FOR OLEFIN POLYMERIZATION, PROCESS FOR POLYMERIZING OLEFIN BY USING THE CATALYST AND POLYOLEFIN PRODUCED BY THE PROCESS

(75) Inventors: Ro-Mi Lee, Chungcheongnam-do (KR); Churl-Young Park, Daejeon Metropolitan (KR); Cheon-Il Park, Daejeon Metropolitan (KR); Dong-Ryul Im, Daejeon Metropolitan (KR); Jin-Woo Lee, Daejeon Metropolitan (KR); Nan-Young Lee, Daejeon Metropolitan (KR)

(73) Assignee: LG Chem, Ltd. (KR)

( * ) Notice: Subject to any disclaimer, the term of this patent is extended or adjusted under 35 U.S.C. 154(b) by 202 days.

(21) Appl. No.: 12/009,555

(22) Filed: Jan. 18, 2008

(65) Prior Publication Data

US 2008/0182950 A1 Jul. 31, 2008

(30) Foreign Application Priority Data

Jan. 26, 2007 (KR) ...................... 10-2007-0008376

(51) Int. Cl.
*C08F 4/50* (2006.01)

(52) U.S. Cl. .................................... 526/124.3; 502/107
(58) Field of Classification Search .............. 526/124.3; 502/107

See application file for complete search history.

(56) References Cited

U.S. PATENT DOCUMENTS 7,022,793 B2 * 4/2006 Galimberti et al. .......... 526/336

FOREIGN PATENT DOCUMENTS

| JP | 60-139710 | 7/1985 |
| JP | 04-096907 | 3/1992 |

* cited by examiner

*Primary Examiner*—Ling-Siu Choi
*Assistant Examiner*—Sonya Wright
(74) *Attorney, Agent, or Firm*—Lerner, David, Littenberg, Krumholz & Mentlik, LLP

(57) ABSTRACT

The present invention relates to a prepolymerized catalyst for olefin polymerization, a process for polymerizing an olefin by using the catalyst and a polyolefin produced by the process, in which a Ziegler-Natta catalyst is prepolymerized sequentially using α-olefin and vinyl saturated cyclic hydrocarbon, and then an olefin is polymerized using the prepolymerized Ziegler-Natta catalyst, thereby producing a polyolefin with high yield. Therefore, the polymerized polyolefin has high Isotactic index, bulk density, and crystallinity.

24 Claims, No Drawings

PREPOLYMERIZED CATALYST FOR OLEFIN POLYMERIZATION, PROCESS FOR POLYMERIZING OLEFIN BY USING THE CATALYST AND POLYOLEFIN PRODUCED BY THE PROCESS

CROSS-REFERENCE TO RELATED APPLICATION

This application claims priority from Korean Patent Application No. 10-2007-0008376 filed on Jan. 26, 2007 in the KIPO, the disclosure of which is incorporated herein by reference in its entirety.

BACKGROUND OF THE INVENTION

1. Field of the Invention

The present invention relates to a prepolymerized catalyst for olefin polymerization, a process for polymerizing an olefin by using the catalyst and a polyolefin produced by the process.

2. Description of the Related Art

Propylene polymers are excellent in the moldability and mechanical strength, and inexpensive and thus widely used as plastics of general purpose. However, depending upon the field of their application, it is desired to improve their properties such as rigidity, transparency and high cycle injection moldability without impairing various characteristics specific to the propylene polymers. It is known that such properties can be improved by increasing the crystallization rate of the propylene polymers.

With respect to additives to improve the crystallization rate, many additives have already been made. Commercially available additives include an aluminum salt of aromatic carboxylic acid, dibenzylidene sorbitol and substituted dibenzylidene sorbitol. These additives (hereinafter, referred to as nucleating agents) is used to improve the crystallization rate while the molten polypropylene is cooled to be a solid state, and thus the spherulite size, which is formed when polymers are crystallized in a spherical form around nucleus and improves the rigidity, is minimized. Therefore, light scattering is reduced, and the improved performance including improvement in transparency and gloss of polypropylene and reduction in molding cycle can be achieved. However, when the nucleating agents are used, shrinkage anisotropy may occur, or depending on molding conditions, the nucleating agents may attach to a die, mold, roll or the like, resulting in a warpage defect. Therefore, the nucleating agent has to be carefully employed according to its uses.

Accordingly, it has been recently suggested that the prepolymerization of vinyl compound is performed to improve the rigidity and transparency of polypropylene. A vinyl saturated cyclic hydrocarbon polymer has a melting point of about 370° C., which is much higher than that of general propylene (melting point of pure isotactic polypropylene is 176° C.), and thus can function as a nucleating agent. Therefore, many studies thereon have been conducted.

For example, JP-S-60-139710 disclosed an addition of nucleating agents, in which a small amount of vinyl saturated cyclic hydrocarbon is polymerized before propylene polymerization. However, there are problems in that the polypropylene powder produced by the method has a greatly reduced bulk density and its productivity is also reduced. Further, the polymerization reactivity of vinyl saturated cyclic hydrocarbon is much lower than those of polypropylene or the like, and even though the polymerization is performed at a high temperature for the purpose of increasing a polymerization rate, the catalytic activity is reduced upon polymerizing propylene. Further, for the purpose of improving the Isotactic index of polypropylene, it has been tried to perform the prepolymerization of vinyl saturated cyclic hydrocarbon in the presence of an external electron donor. However, there is also a problem in that the method reduces the polymerization reactivity of vinyl saturated cyclic hydrocarbon.

Further, JP-H-04-96907 suggested a process for prepolymerizing an olefin being suitable for obtaining a polypropylene having high transparency, in which a multi-stage prepolymerization of olefin is performed in the presence of a titanium compound, an organic aluminum compound and an organic silicon compound, different organic silicon compounds are used in the every prepolymerization stages, and vinyl saturated cyclic hydrocarbon and a styrene compound are also polymerized in at least one stage of the every prepolymerization stages. However, in this method, the polymerization ability of the catalyst is inevitably reduced upon polymerizing propylene.

SUMMARY OF THE INVENTION

In order to solve the above problems, the present inventors have conducted extensive studies, and as a result, they found that by prepolymerizing a Ziegler-Natta catalyst sequentially using α-olefin and vinyl saturated cyclic hydrocarbon without any external electron donor, and then polymerizing an olefin using the prepolymerized Ziegler-Natta catalyst, a highly crystalline and transparent polyolefin having a high crystallization temperature and bulk density can be obtained while maintaining a high catalytic activity and Isotactic index. Therefore, it is an object of the present invention to provide a prepolymerized Ziegler-Natta catalyst capable of polymerizing an olefin, a process for polymerizing an olefin by using the catalyst and a polyolefin produced by the process.

The present invention provides a method for producing a catalyst for olefin polymerization, comprising the steps of a) first prepolymerizing a Ziegler-Natta catalyst and α-olefin; and b) second prepolymerizing the Ziegler-Natta catalyst by adding vinyl saturated cyclic hydrocarbon to the Ziegler-Natta catalyst that is polymerized with α-olefin obtained in the step a) without an additional washing step.

Further, the present invention provides a catalyst for olefin polymerization produced by the method for producing a catalyst for olefin polymerization.

Further, the present invention provides a process for polymerizing an olefin, comprising the steps of A) first prepolymerizing a Ziegler-Natta catalyst and α-olefin, and then second prepolymerizing the first prepolymerized Ziegler-Natta catalyst by adding vinyl saturated cyclic hydrocarbon without a washing step to produce a prepolymerized Ziegler-Natta catalyst; and B) polymerizing an olefin using the Ziegler-Natta catalyst prepolymerized in the step A).

Further, the present invention provides a polyolefin produced by the process for polymerizing an olefin.

According to the present invention, a Ziegler-Natta catalyst is sequentially polymerized using two specific types of olefins, and then an olefin is polymerized using the prepolymerized Ziegler-Natta catalyst, thereby producing a polyolefin with high yield. Therefore, the polymerized polyolefin has high Isotactic index, bulk density, and crystallinity.

DESCRIPTION OF THE PREFERRED EMBODIMENTS

Hereinafter, the present invention will be described in detail.

A method for producing a catalyst for olefin polymerization of the present invention is characterized in that it comprises a step of sequentially polymerizing a Ziegler-Natta catalyst with two specific types of olefins.

In the method for producing a catalyst for olefin polymerization, when a Ziegler-Natta catalyst is sequentially prepolymerized with two types of olefin monomers, the order of adding the olefin monomer functions as a major factor that considerably affects a crystallization temperature, Isotactic index, melt flow index or the like of the resulting polyolefin.

The present invention is characterized in that as olefin monomers that are sequentially added to the Ziegler-Natta catalyst, α-olefin and vinyl saturated cyclic hydrocarbon are sequentially added. It is because when the particles of the Ziegler-Natta catalyst is first prepolymerized with α-olefin, the surface of the Ziegler-Natta catalyst is coated with a polymer of α-olefin, and the following vinyl saturated cyclic hydrocarbon is adsorbed on the Ziegler-Natta catalyst complex to coordinate to a cation of organic metal, thereby preventing the catalyst particles from breaking. Accordingly, the catalyst particles become more uniform, and the resulting polymer produced by the catalyst according to the present invention shows an improved morphology.

Further, the present invention is characterized in that an additional washing step is not performed in the step b) of the method for producing a catalyst for olefin polymerization. If the catalyst is washed, an increase in the particle size of the catalyst is reduced. Thus, by not performing the washing step, a high density of catalyst particles can be achieved.

A prepolymerization temperature generally affects the Isotactic index and activity. Therefore, the prepolymerization is performed at a temperature of less than 50° C., preferably 0 to 30° C., and at a pressure of 0 to 5 atm, preferably 0.1 to 2 atm.

In the process according to the present invention, the term 'polymerization' encompasses not only homopolymerization of olefins but also copolymerization of two or more types of olefins, for example, producing a copolymer by copolymerizing α-olefin such as ethylene, 1-butene, and 1-hexene with olefin such as propylene.

In the present invention, the Ziegler-Natta catalyst is dispersed in the prepolymerization process to be uniform particles, and then the surface of the Ziegler-Natta catalyst is first coated with the prepolymerized α-olefin and vinyl saturated cyclic hydrocarbon is adsorbed on the catalyst complex to coordinate to a cation of organic metal, resulting in a prepolymerized catalyst. Any Ziegler-Natta catalyst can be used without limitation if it is generally used for olefin polymerization, and Ziegler-Natta catalyst includes transition metal compounds containing elements from Group IV, V or VI; and organic metal compounds containing elements from Group XIII of the periodic table are included.

The transition metal compounds is used as a main catalyst of the Ziegler-Natta catalyst, and a solid titanium catalyst component containing magnesium, titanium, halogen atoms and internal electron donors can be preferably used. In this connection, examples of the internal electron donor may include diether compounds, phthalate compounds, and a mixture thereof, specifically diisobutylphthalate.

The instance of above organic metal compound, as a cocatalyst of the Ziegler-Natta catalyst, comprises elements from Group XIII of the periodic table, such as Al, Ga, In, Ti or the like but is not limited thereto. Preferably the organic metal compound comprises an organic aluminum compound, for example one or more selected from the group consisting of trialkylaluminum, dialkyl aluminum halide, alkyl aluminum dihalide, aluminum dialkyl hydride, and alkyl aluminum sesquihalide.

In particular, examples of the organic metal compound include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_8)_3$, $(C_2H_5)AlCl_2$, $(C_2H_5)_2AlCl$, and $(C_2H_5)_3Al_2Cl_3$.

Further, as the organic metal compound, a mixture of organic aluminum compounds may be used. Preferably a mixture of diverse organic aluminum compounds can be used. Examples of the mixture of the as above organic aluminum compound include a mixture of $Al(C_2H_5)_3$ and $Al(i-C_4H_9)_3$; a mixture of $Al(C_3H_7)_3$, $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$ but are not limited thereto.

In this connection, the molar ratio of the organic metal compound to the transition metal compound is preferably 5 to 50.

Examples of the α-olefin include olefins having 2 to 20 carbon atoms such as ethylene, propylene, 1-butene, 1-hexene, and 4-methyl-1-pentene. In particular, propylene is preferably used.

The feed rate is preferably (0.02 to 20 g of olefin/gram of Ziegler-Natta catalyst)/hour, more preferably (0.02 to 6 g of olefin/gram of Ziegler-Natta catalyst)/hour.

Examples of the vinyl saturated cyclic hydrocarbon include vinyl saturated cyclic hydrocarbon having 5 to 10 carbon atoms such as vinylcyclobutane, vinylcyclopentane, vinylcyclohexane, vinyl-3-methylcyclopentane, vinyl-2-methylcyclohexane, vinyl-3-methylcyclohexane, and vinylnorbornene, and preferably vinylcyclohexane. The feed rate is (0.02 to 50 g of vinyl saturated cyclic hydrocarbon/gram of Ziegler-Natta catalyst)/hour, and preferably (20 to 30 g of vinyl saturated cyclic hydrocarbon/gram of Ziegler-Natta catalyst)/hour.

The present invention provides a catalyst for olefin polymerization produced by the method for producing a catalyst for olefin polymerization. In this connection, it is preferable that the prepolymerized catalyst for olefin polymerization is not in a dry solid form but preferably in a slurry form. It is because the catalytic activity is reduced during a drying process and the activity of the dried catalyst is sharply reduced with time. Therefore, the catalyst is stored in a slurry form to maintain the catalytic activity.

In the method for producing a catalyst for olefin polymerization of the present invention, examples of the preferable nonpolar solvent used for prepolymerization include saturated aliphatic hydrocarbons such as hexane, n-heptane, octane, nonane, and decane, and saturated cyclic hydrocarbons such as cyclopentane and cyclohexane. Among them, hexane is most preferable. It is preferable that the nonpolar solvents are purified to be used in order not to affect the catalytic activity.

Further, the present invention provides a process for polymerizing an olefin, comprising the steps of A) first prepolymerizing a Ziegler-Natta catalyst and α-olefin, and then second prepolymerizing the first prepolymerized Ziegler-Natta catalyst by adding vinyl saturated cyclic hydrocarbon without a washing step to produce a prepolymerized Ziegler-Natta catalyst; and B) polymerizing an olefin using the Ziegler-Natta catalyst prepolymerized in the step A).

According to the process for polymerizing an olefin of the present invention, the Ziegler-Natta catalyst is first prepolymerized with α-olefin, and without washing the first prepolymerized Ziegler-Natta catalyst, vinyl saturated cyclic hydrocarbon is added thereto, followed by second prepolymerization. Then, olefins can be polymerized using the prepolymerized Ziegler-Natta catalyst. As described above, even though the second prepolymerized Ziegler-Natta catalyst is used without the step of washing the first prepolymerized Ziegler-Natta catalyst, a highly transparent polyolefin having a crystallization temperature of 123 to 135° C. or an bulk density of 0.43 to 0.48 g/ml can be produced.

Further, the step A) is characterized in that the Ziegler-Natta catalyst is prepolymerized without any external electron donor. In the case of performing the prepolymerization without any external electron donor, the catalytic activity can be increased while maintaining the Isotactic index.

In the polymerization step, α-olefin and vinyl saturated cyclic hydrocarbon are bound to the Ziegler-Natta catalyst, and then the olefin polymerization step is performed using the Ziegler-Natta catalyst. Therefore, the olefin polymerization using the catalyst of the present invention can be performed in the same manners as in a conventional olefin polymerization using a Ziegler-Natta catalyst. However, it is preferable that the olefin polymerization of the present invention is virtually performed in the absence of oxygen and water. In this connection, the olefin polymerization can be preferably performed at a temperature of about 20 to 200° C., more preferably about 50 to 180° C., and at a pressure of 1 to 100 atm, preferably about 2 to 50 atm. The polymerization time does not greatly affect the polymerization of the present invention, but the polymerization is preferably performed for 1 hour or more.

In the step B) of the process for polymerizing an olefin of the present invention, the olefin polymerization step using the prepolymerized Ziegler-Natta catalyst may be performed further using an external electron donor for the Isotactic index of the resulting polyolefin.

Examples of the external electron donor include at least one selected from the group consisting of a substituted or unsubstituted alkyl group having 1 to 20 carbon atoms, a substituted or unsubstituted aryl group having 6 to 30 carbon atoms, a substituted or unsubstituted cycloalkyl group having 5 to 30 carbon atoms, and a substituted or unsubstituted alkoxy group having 1 to 20 carbon atoms, and preferably organic silane compounds containing at least one oxygen atom.

Specific examples of the external electron donor include aromatic organic silane compounds such as diphenyldimethoxysilane, phenyltrimethoxysilane, phenylethyldimethoxysilane and phenylmethyldimethoxysilane; aliphatic organic silane compounds such as trimethylmethoxysilane, isobutyltrimethoxysilane, diisobutyldimethoxysilane, diisopropyldimethoxysilane, di-t-butyldimethoxysilane, dicyclopentyldimethoxysilane, cyclohexylmethyldimethoxysilane and dicyclohexyldimethoxysilane; and mixtures thereof.

If the polyolefin produced by the process for polymerizing an olefin is a homopolymer, it is preferable that the polyolefin has a crystallization temperature in a range of 123 to 135° C. and a bulk density in a range of 0.43 to 0.48 g/ml. Further, its melt flow index is in a range of 5±4 g/10 min or its activity can be relatively improved.

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

Preparation Example 1

Preparation of Catalyst

Preparation of Catalyst (a):

A catalyst (a) refers to a [Mixed catalyst] of the following Catalyst 1 and Catalyst 2, and prepared as follows.

[Catalyst 1]: Preparation of Transition Metal Compound 25.25 g of magnesium compound ($MgCl_2 \cdot 77C_2H_5OH$) and 150 ml of anhydrous heptane were added to a 500 ml glass reactor at 0° C. under nitrogen atmosphere, and stirred. Then, 21.6 ml of diisobutylphthalate as a phthalate compound was added dropwise, and stirred for 10 minutes. Next, 100 ml of $TiCl_4$ at 0° C. was added thereto, and subjected to the reaction at room temperature for 1 hour. Then, 150 ml of $TiCl_4$ was further added dropwise, the temperature was raised to 100° C., and subjected to the reaction for 2 hours. Subsequently, the supernatant was separated. 200 ml of $TiCl_4$ was added dropwise, and reacted at 120° C. for 2 hours. After completing the reaction, $TiCl_4$ was removed. Then, the resultant was washed with heptane six times at 80° C., and dried under vacuum at 40° C. to be stored.

[Catalyst 2]: Preparation of Transition Metal Compound 25.25 g of magnesium compound ($MgCl_2 \cdot 77C_2H_5OH$) and 150 ml of anhydrous heptane were added to a 500 ml glass reactor at 0° C. under nitrogen atmosphere, and stirred. Then, 21.6 ml of 2,2-diisobutyl-1,3-dimethoxypropane as a diether compound was added dropwise, and stirred for 10 minutes. Next, 100 ml of $TiCl_4$ at 0° C. was added thereto, and subjected to the reaction at room temperature for 1 hour. Then, 150 ml of $TiCl_4$ was further added dropwise, the temperature was raised to 100° C., and subjected to the reaction for 2 hours. Subsequently, the supernatant was separated. 200 ml of $TiCl_4$ was added dropwise, and reacted at 120° C. for 2 hours. After completing the reaction, $TiCl_4$ was removed. Then, the resultant was washed with heptane six times at 80° C., and dried under vacuum at 40° C. to be stored.

[Mixed Catalyst]: Preparation of Mixed Catalyst of [Catalyst 1] and [Catalyst 2]

The prepared [Catalyst 1] and [Catalyst 2] were mixed with each other at a volume ratio of 1:1, and then dried under vacuum to be stored. 2.1% by weight of titanium atom was contained in the solid titanium catalyst.

Example 1

Propylene Polymerization Process

Step A: Prepolymerization

A reactor with a capacity of 0.5 L was purged with argon at high temperature, and then 2 g of the prepared catalyst (a), 200 ml of hexane, 8.75 mmol of triisobutylaluminum were added thereto. The flow of propylene was set at 18 cc/min, and a first prepolymerization was performed for 1 hour at 20° C. Without washing the first prepolymerized catalyst with any solvent, 10 g of vinylcyclohexane was injected at 20° C., and then a second prepolymerization was performed for 2 hours. At this time, in the first and second prepolymerization steps, an external electron donor was not used. Then, the resultant was washed with hexane three times. The hexane slurry was used for polymerization, and the residual was dried under vacuum at room temperature for 2 hours. In the prepared polymerization catalyst, the amount of high molecular weight monomer that was polymerized around the catalyst was made to be 1 to 4 g per 1 g of the catalyst.

Step B: Polymerization

An autoclave reactor with a capacity of 2 L was dried under vacuum for 1 hour, and then sufficiently purged with nitrogen. 4 mmol of triethylaluminum, 0.4 mmol of dicyclopentyldimethoxysilane, and the prepolymerized catalyst, of which volume was measured in the hexane slurry phase to have a titanium content of 5.0 ppm, were injected to the reactor at room temperature. 3300 ppm of hydrogen was injected, and then 1.2 L of liquid propylene was injected. While stirring the reactor, the temperature was raised to 70° C., and a polymerization was performed for 1 hour. After completing the polymerization, the unreacted gas was removed, and the temperature was cooled to room temperature to complete the reaction. The produced polymer was isolated and collected, and then dried in a vacuum oven at 70° C. for 1 hour or more to give a white polymer. The polymerization results are summarized in the following Table 2.

Example 2

A prepolymerization was performed under the same prepolymerization conditions as Step A of Example 1, except that triethylaluminum was used instead of triisobutylaluminum. A polymerization was performed under the same polymerization conditions as Step B of Example 1, to give a white polymer. The polymerization results are summarized in the following Table 2.

Example 3

A prepolymerization and polymerization were performed under the same conditions as Example 1 to give a white polymer, except that the flow of ethylene instead of using propylene was set at 12 cc/min, and polymerized for 1 hour at 20° C. during the prepolymerization process in Step A of Example 1. The polymerization results are summarized in the following Table 2.

Comparative Example 1

A polymerization was performed in the same manners as in Example 1, except that without the prepolymerization process, 10 mg of the catalyst (a) was used and dicyclopentyldimethoxysilane was used as an external electron donor. The polymerization results are summarized in the following Table 2.

Comparative Example 2

A prepolymerization and polymerization were performed under the same conditions as Example 1 to give a white polymer, except that the first prepolymerized catalyst was washed with a hexane solvent once during the prepolymerization process in Step A of Example 1. The polymerization results are summarized in the following Table 2.

Comparative Example 3

A prepolymerization and polymerization were performed under the same conditions as Example 1 to give a white polymer, except that the prepolymerized catalyst was used in a solid form, not in a hexane slurry form during the prepolymerization process in Step A of Example 1. The polymerization results are summarized in the following Table 2.

Comparative Example 4

A prepolymerization and polymerization were performed under the same conditions as Example 1 to give a white polymer, except that the prepolymerization was performed at 50° C. during the prepolymerization process in Step A of Example 1. The polymerization results are summarized in the following Table 2.

Comparative Example 5

A prepolymerization and polymerization were performed under the same conditions as Example 1 to give a white polymer, except that 8.75 mmol of trimethylmethoxysilane was added as an external electron donor during the prepolymerization process in Step A of Example 1. The polymerization results are summarized in the following Table 2.

Comparative Example 6

A prepolymerization and polymerization were performed under the same conditions as Example 2 to give a white polymer, except that 8.75 mmol of trimethylmethoxysilane was added as an external electron donor during the prepolymerization process in Step A of Example 2. The polymerization results are summarized in the following Table 2.

Comparative Example 7

A prepolymerization and polymerization were performed under the same conditions as Comparative Example 6 to give a white polymer, except that 8.75 mmol of dimethylmethoxysilane instead of trimethylmethoxysilane was added as an external electron donor during the prepolymerization process in Step A of Comparative Example 6. The polymerization results are summarized in the following Table 2.

The conditions of Examples 1 to 3 and Comparative Examples 1 to 7 are summarized in the following Table 1.

vinylcyclohexane, the activity is greatly reduced to slightly reduce an Isotactic index and a bulk density.

TABLE 1

| Example/Comparative Example | Prepolymerization condition | | | | | | *Polymerization condition | | |
|---|---|---|---|---|---|---|---|---|---|
| | External electron donor | Organic aluminum compound | Reaction temperature (° C.) | Injection order of monomer | | | Catalyst injection | External electron donor | Al/Si |
| | | | | 1 | Washing | 2 | | | |
| Example 1 | — | TIBA | 20 | Propylene | X | VCH | S | DCPMDS | 10 |
| Example 2 | — | TEA | 20 | Propylene | X | VCH | S | DCPMDS | 10 |
| Example 3 | — | TIBA | 20 | ethylene | X | VCH | S | DCPMDS | 10 |
| Comparative Example 1 | | — | | | | | S | DCPMD | 10 |
| Comparative Example 2 | — | TIBA | 20 | Propylene | ○ | VCH | S | DCPMDS | 10 |
| Comparative Example 3 | — | TIBA | 20 | Propylene | X | VCH | D | DCPMDS | 10 |
| Comparative Example 4 | — | TIBA | 50 | Propylene | X | VCH | S | DCPMDS | 10 |
| Comparative Example 5 | TMMS | TIBA | 20 | Propylene | X | VCH | S | DCPMDS | 10 |
| Comparative Example 6 | TMMS | TEA | 20 | Propylene | X | VCH | S | DCPMDS | 10 |
| Comparative Example 7 | DMDMS | TEA | 20 | Propylene | X | VCH | S | DCPMDS | 10 |

*Polymerization Condition: Injection amount of hydrogen (hydrogen/propylene: 3300 molppm), Reaction hour (1 hr), Reaction temperature (70° C.)
VCH: Vinylcyclohexane,
TMMS: Trimethylmethoxysilane,
DCPMDS: Dicyclopentyldimethoxysilane,
TEA: Triethylaluminum,
TIBA: Triisobutylaluminum,
S: Catalyst in slurry form
D: dried catalyst

TABLE 2

| Example/Comparative Example | Polymerization result | | | | |
|---|---|---|---|---|---|
| | Activity (kg PP/g cat) | MI (g/10 min) | Isotactic index (%) | Crystallization temperature (° C.) | Bulk density (g/ml) |
| Example 1 | 25.2 | 2.8 | 98.8 | 129.1 | 0.48 |
| Example 2 | 28.5 | 3.3 | 99.0 | 125.4 | 0.43 |
| Example 3 | 25.0 | 4.9 | 98.3 | 125.4 | 0.36 |
| Comparative Example 1 | 27.2 | 17.8 | 99.3 | 111.1 | 0.41 |
| Comparative Example 2 | 25.1 | 4.8 | 98.9 | 127.4 | 0.42 |
| Comparative Example 3 | 4.6 | 10.6 | 98.8 | 129.7 | 0.44 |
| Comparative Example 4 | 20.0 | 6.8 | 97.7 | 127.9 | 0.45 |
| Comparative Example 5 | 22.3 | 3.3 | 98.5 | 129.0 | 0.48 |
| Comparative Example 6 | 14.3 | 5.4 | 98.4 | 129.3 | 0.46 |
| Comparative Example 7 | 6.7 | 7.6 | 98.0 | 123.5 | 0.45 |

With reference to Table 2, it can be seen that the produced polymers had higher crystallization temperature in Examples performing the prepolymerization in a mild condition using propylene and vinylcyclohexane, as compared to Comparative Example 1 not performing the prepolymerization. It indicates that vinylcyclohexane having a high melting point is present in the polymer chain to greatly increase the crystallization temperature from 111.1 to 125° C. However, it is found that in the case of performing the prepolymerization using vinylcyclohexane, the activity is greatly reduced to slightly reduce an Isotactic index and a bulk density.

In Comparative Example 2, the first prepolymerized catalyst was washed, and then a second prepolymerization process was performed. Therefore, after the first prepolymerization, the reaction between the catalyst and vinylcyclohexane did not occur due to the washing step. As a result, since there is no difference between the catalyst morphology and the known catalyst morphology, the improvement in the bulk density can not be expected.

In Examples, the prepolymerized catalyst was stored in a hexane slurry form, and used for polymerization. However, in Comparative Example 3, the prepolymerized catalyst was dried, and used for polymerization, which causes a great decrease in its activity.

In Comparative Example 4, the prepolymerization was performed at 50° C., not at 20° C. As a result, it is found that the activity and Isotactic index are greatly decreased, because of the instability of the catalyst at a high temperature.

In Comparative Examples 6 and 7, triethylaluminum was used as a cocatalyst, and trimethylmethoxysilane and dimethyldimethoxysilane were used as an external electron donor in order to increase the Isotactic index. However, as shown in Table 2, the activity is greatly reduced, as compared to Example 2 without using any external electron donor, and an increase in the Isotactic index is not also found.

In Comparative Examples 5, 6, and 7, the catalyst particles are uniformly formed, and thus the morphology of polyolefin is uniformly formed, whereby the bulk density is found to be increased by 0.45 to 0.48.

In Examples 1 and 2, triisobutylaluminum and triethylaluminum were only used as a cocatalyst without using any external electron donor in order to confirm an increase in the activity.

In Example 2, it is found that the crystallization temperature was increased by 125.4° C. due to vinylcyclohexane, as compared to Comparative Example 1 without performing the prepolymerization, and the activity is increased and the Isotactic index was increased by about 1%, as compared to Comparative Examples 5 and 6 using an external electron donor in the prepolymerization step.

In Example 1, it is found that the activity and the Isotactic index are slightly increased, as compared to Comparative Example 3 using an external electron donor in the prepolymerization step, and the crystallization temperature and the bulk density are greatly increased by 129.1° C. and 0.48, respectively, as compared to Comparative Example 1 without performing the prepolymerization.

In both cases, it is found that the crystallization temperature can be increased by performing the prepolymerization, and even though no external electron donor was added during the prepolymerization process, the Isotactic index being similar to that of Comparative Example 1 was ensured, and more excellent results were obtained in consideration of the activity and bulk density.

Preparation Example 2

Preparation of Catalyst

Preparation of Catalyst (b):

25.25 g of magnesium compound ($MgCl_2 \cdot 77C_2H_5OH$) and 150 ml of anhydrous heptane were added to a 500 ml glass reactor at 0° C. under nitrogen atmosphere, and stirred. Then, 21.6 ml of diisobutylphthalate as a phthalate compound was added dropwise, and stirred for 10 minutes. Next, 100 ml of $TiCl_4$ at 0° C. was added thereto, and subjected to the reaction at room temperature for 1 hour. Then, 150 ml of $TiCl_4$ was further added dropwise, the temperature was raised to 100° C., and subjected to the reaction for 2 hours. Subsequently, the supernatant was separated. 200 ml of $TiCl_4$ was added dropwise, and reacted at 120° C. for 2 hours. After completing the reaction, $TiCl_4$ was removed. Then, the resultant was washed with heptane six times at 80° C., and dried under vacuum at 40° C. to be stored.

Example 4

Propylene Polymerization Process

Step A: Prepolymerization

A reactor with a capacity of 0.5 L was purged with argon at high temperature, and then 2 g of the prepared catalyst (b), 200 ml of hexane, and 8.75 mmol of triisobutylaluminum were added thereto. The flow of propylene was set at 18 cc/min, and a first prepolymerization was performed for 1 hour at 20° C. Without washing the first prepolymerized propylene with any solvent, 10 g of vinylcyclohexane was injected at 20° C., and then a second prepolymerization was performed for 2 hours. At this time, in the first and second prepolymerization steps, an external electron donor was not used. Then, the resultant was washed with hexane three times. The hexane slurry was used for polymerization, and the residual was dried under vacuum at room temperature for 2 hours. In the prepared polymerization catalyst, the amount of high molecular weight monomer that was polymerized around the catalyst was made to be 1 to 4 g per 1 g of the catalyst.

Step B: Polymerization

An autoclave reactor with a capacity of 2 L was dried under vacuum for 1 hour, and then sufficiently purged with nitrogen. 4 mmol of triethylaluminum, 0.4 mmol of dicyclopentyldimethoxysilane, and the prepolymerized catalyst, of which volume was measured to have a titanium content of 5.0 ppm, were injected to the reactor at room temperature. 3300 ppm of hydrogen was injected, and then 1.2 L of liquid propylene was injected. While stirring the reactor, the temperature was raised to 70° C., and a polymerization was performed for 1 hour. After completing the polymerization, the unreacted gas was removed, and the temperature was cooled to room temperature to complete the reaction. The produced polymer was isolated and collected, and then dried in a vacuum oven at 70° C. for 1 hour or more to give a white polymer. The polymerization results are summarized in the following Table 4.

Example 5

A prepolymerization and polymerization were performed under the same conditions as Example 4 to give a white polymer, except that triethylaluminum was used instead of triisobutylaluminum during the prepolymerization process in Step A of Example 4. The polymerization results are summarized in the following Table 4.

Example 6

Block Copolymerization of Propylene and Ethylene

Step A: Prepolymerization

A catalyst was prepolymerized in the same manners as in Example 4.

Step B: Polymerization

An autoclave reactor with a capacity of 2 L was dried under vacuum for 1 hour, and then sufficiently purged with nitrogen. 4 mmol of triethylaluminum, 0.4 mmol of dicyclopentyldimethoxysilane, and the prepolymerized catalyst, of which volume was measured to have a titanium content of 5.0 ppm, were injected to the reactor at room temperature. 3300 ppm of hydrogen was injected, and then 1.2 L of liquid propylene was injected. While stirring the reactor, ethylene (about 2% by weight) was continuously introduced to the reactor, and a gas phase copolymerization of ethylene and propylene was performed at the temperature of 70° C. for 1 hour. After completing the polymerization, the unreacted gas was removed, and the temperature was cooled to room temperature to complete the reaction. The produced polymer was isolated and collected, and then dried in a vacuum oven at 70° C. for 1 hour or more to give a white polymer. The polymerization results are summarized in the following Table 4.

Example 7

A prepolymerization and polymerization were performed under the same conditions as Example 6 to give a white polymer, except that triethylaluminum was used instead of triisobutylaluminum during the prepolymerization process in Step A of Example 6. The polymerization results are summarized in the following Table 4.

Comparative Example 8

A polymerization was performed in the same manners as in Example 4, except that without the prepolymerization process, 10 mg of the catalyst (b) was used and dicyclopentyldimethoxysilane was used as an external electron donor. The polymerization results are summarized in the following Table 4.

Comparative Example 9

A prepolymerization and polymerization were performed under the same conditions as Example 4 to give a white polymer, except that 8.75 mmol of trimethylmethoxysilane was added as an external electron donor during the prepolymerization process in Step A of Example 4. The polymerization results are summarized in the following Table 4.

Comparative Example 10

A polymerization was performed in the same manners as in Example 6, except that without the prepolymerization process, 10 mg of the catalyst (b) was used and dicyclopentyldimethoxysilane was used as an external electron donor. The polymerization results are summarized in the following Table 4.

Comparative Example 11

A prepolymerization and polymerization were performed under the same conditions as Example 7 to give a white polymer, except that 8.75 mmol of trimethylmethoxysilane was added as an external electron donor during the prepolymerization process in Step A of Example 7. The polymerization results are summarized in the following Table 4.

The polymerization conditions of Examples 4 to 7 and Comparative Examples 8 to 11 are summarized in the following Table 3.

TABLE 3

| Example/ Comparative Example | Prepolymerization condition ||||| *Polymerization condition ||
|---|---|---|---|---|---|---|
| | External electron donor | Organic aluminum compound | Injection order of monomer || External electron donor | Al/Si |
| | | | 1 | 2 | | |
| Example 4 | — | TIBA | Propylene | VCH | DCPMDS | 10 |
| Example 5 | — | TEA | Propylene | VCH | DCPMDS | 10 |
| Example 6 | — | TIBA | Propylene | VCH | DCPMDS | 10 |
| Example 7 | — | TEA | Propylene | VCH | DCPMDS | 10 |
| Comparative Example 8 | | | — || DCPMDS | 10 |
| Comparative Example 9 | TMMS | TEA | Propylene | VCH | DCPMDS | 10 |
| Comparative Example 10 | | | — || DCPMDS | 10 |
| Comparative Example 11 | TMMS | TEA | Propylene | VCH | DCPMDS | 10 |

*Polymerization Condition: Injection amount of hydrogen (hydrogen/propylene: 3300 molppm), Reaction hour (1 hr), Reaction temperature (70° C.)
VCH: Vinylcyclohexane,
TMMS: Trimethylmethoxysilane
TEA: Triethylaluminum,
TIBA: Triisobutylaluminum

TABLE 4

| Example/ Comparative Example | Polymerization result ||||||
|---|---|---|---|---|---|---|
| | Activity (kg PP/g cat) | ET content | MI (g/10 min) | Isotactic index (%) | Crystallization temperature (° C.) | Bulk density (g/ml) |
| Example 4 | 27.5 | — | 3.2 | 97.7 | 127.6 | 0.45 |
| Example 5 | 25.1 | — | 2.0 | 97.9 | 123.4 | 0.43 |
| Example 6 | 27.6 | 2.3 | 1.0 | 96.0 | 119.6 | 0.45 |
| Example 7 | 30.3 | 2.2 | 0.8 | 97.2 | 117.9 | 0.43 |
| Comparative Example 8 | 27.6 | — | 1.1 | 98.9 | 104.1 | 0.43 |
| Comparative Example 9 | 22.4 | — | 2.6 | 97.4 | 125.6 | 0.44 |
| Comparative Example 10 | 27.3 | 2.3 | 1.4 | 96.2 | 99.7 | 0.39 |
| Comparative Example 11 | 20.6 | 1.5 | 2.1 | 94.4 | 120.2 | 0.44 |

With reference to Examples 4 to 7 of Table 4, it can be seen that in the case of using the mixed catalyst of 2,2-diisobutyl-1,3-dimethoxypropane as a diether compound and diisobutylphthalate as a phthalate compound, the crystallization temperature and bulk density are increased, and the activity and Isotactic index are maintained without using any external electron donor during the prepolymerization of vinylcyclohexane.

In Examples 6 and 7, copolymerization of ethylene and propylene was performed using the prepolymerization catalyst used in Examples 4 and 5, so as to confirm its application to copolymerization.

In Examples 4 to 7, it is found that without using any external electron donor during prepolymerization, the activity and Isotactic index are increased, as compared to Comparative Example 9 (homopolymerization) and Comparative Example 10 (copolymerization) using an external electron donor during prepolymerization. Further, as Examples 4 and 5 and Comparative Example 8 (homopolymerization), and Examples 6 and 7 and Comparative Example 10 (copolymerization) are compared to each other, it is found that in Examples according to the present invention, the crystallization temperature and bulk density are improved due to the effect of prepolymerization.

According to the process for polymerizing an olefin of the present invention, the Ziegler-Natta catalyst is second prepolymerized without the step of washing the first prepolymerized Ziegler-Natta catalyst, and the Ziegler-Natta catalyst is produced without any external electron donor to be used for polymerization. As a result, the produced homopolymer has a crystallization temperature of 123 to 135° C. or a bulk density of 0.43 to 0.48 g/ml, and a polyolefin having an improved Isotactic index and transparency can be produced.

Properties of the polymers synthesized in Examples were measured by the methods described below.

(1) Activity

The polymerization activity of the catalyst (kg PP/g catalyst) was calculated from the weight ratio of the produced polymer (kg PP) per the amount of the used catalyst (g catalyst).

(2) Melt Flow Index (MI)

The melt flow index was measured in accordance with ASTM D1238 under the conditions of a temperature of 230° C. and a load of 2.16 kg, and represented by the weight (g) of the melted polymer extruded for 10 minutes (g/10 min).

(3) Isotactic Index

The Isotactic index (%) of polymer is a weight ratio of polymer not extracted with boiling o-xylene for 1 hour (Unit: %). The measurement of Isotactic index in the polymer will be described in detail as follows.

First, 200 ml of o-xylene was prepared in a flask, and filtered with a 200 mm filter paper (No. 4). An aluminum pan was dried in an oven at 150° C. for 30 minutes, and then cooled in a desiccator to measure the mass. Next, 100 ml of the filtered o-xylene was transferred to the aluminum pan using a pipette, and heated to 145 to 150° C. to completely evaporate o-xylene. Then, the aluminum pan was dried under vacuum at a temperature of 100±5° C. and a pressure of 13.3 kP for 1 hour. Subsequently, the aluminum pan was cooled in the desiccator, and the above procedure was repeated twice to finish a blank test of o-xylene within a weight error of 0.0002 g.

Next, the polymer produced in Example 1 was dried (70° C., 13.3 kPa, 60 min, under vacuum), and then 2 g±0.0001 g of the polymer sample cooled in the desiccator was put in a 500 ml flask. 200 ml of o-xylene was added thereto. The flask was connected to nitrogen and cooling water, and heated for 1 hour to continuously reflux o-xylene. Then, the flask was left in the air for 5 minutes and cooled under 100° C. The flask was shaken, and put in a water bath (25±0.5° C.) for 30 minutes to precipitate the insoluble matter. The resulting solution having precipitates was filtered with a 200 mm filter paper (No. 4), and the procedure was repeated until the solution became clear. The solution was dried at 150° C. for 30 minutes, and then cooled in the desiccator. 100 ml of the resulting solution that had been clearly filtered was placed on the aluminum pan that had already weighed. The aluminum pan was heated to 145 to 150° C. to evaporate o-xylene. After evaporation, the aluminum pan was dried under vacuum at a temperature of 70±5° C. and a pressure of 13.3 kP for 1 hour. The cooling step in the desiccator was repeated twice, and its weight was measured with a weight error of 0.0002 g.

In accordance with the following Mathematical Formula, the percent by weight (Xs) of the polymer solubilized in o-xylene was determined, and from this, the weight ratio (=100−Xs) of the polymer not extracted with o-xylene was determined, which is defined as Isotactic index (XI).

$$Xs = \left(\frac{Vbo}{Vb1} \times (W2 - W1) - \frac{Vbo}{Vb2} XB\right) / Wo \times 100 \quad \text{[Mathematical Formula]}$$

wherein,

Xs=polymer solubilized in o-xylene, % by weight

Vbo=initial volume of o-xylene, ml (=200 ml)

Vb1=obtained volume of polymer solubilized in o-xylene, ml (=100 ml)

Vb2=obtained volume of o-xylene used upon blank test, ml (=100 ml)

W2=total weight of polymer that remains in aluminum pan after evaporation of aluminum pan and o-xylene, g W1=weight of aluminum pan, g Wo=initial weight of polymer, g (=2 g)

B=mean value of residual in aluminum pan upon blank test, g

Isotactic index (XI)=100−Xs (weight ratio of polymer not extracted with o-xylene)

(4) Crystallization Temperature

Crystallization temperature was measured with a differential scanning calorimeter (DSC-1 type) manufactured by Perkin Elmer at a rate of 10° C./min.

(5) Polymerization Result

Polymerization results were summarized in Tables 2 and 4, in accordance with the bulk density (g/ml), melt flow index (g/10 min), Isotactic index (weight ratio of polymer not extracted with o-xylene (% by weight)), and crystallization temperature (Tc) of polymers.

What is claimed is:

1. A method for producing a catalyst for olefin polymerization, comprising the steps of
    a) first prepolymerizing a Ziegler-Natta catalyst and α-olefin; and
    b) second prepolymerizing the Ziegler-Natta catalyst by adding vinyl saturated cyclic hydrocarbon to the Ziegler-Natta catalyst that is polymerized with α-olefin obtained in the step a) without an additional washing step.

2. The method for producing a catalyst for olefin polymerization according to claim 1, wherein in the steps a) and b), the prepolymerization is performed without any external electron donor.

3. The method for producing a catalyst for olefin polymerization according to claim 1, wherein in the steps a) and b), the prepolymerization is performed at less than 50° C.

4. The method for producing a catalyst for olefin polymerization according to claim 1, wherein in the step b), the feed rate of the vinyl saturated cyclic hydrocarbon is (0.02 to 50 g of vinyl saturated cyclic hydrocarbon/gram of Ziegler-Natta catalyst)/hour.

5. The method for producing a catalyst for olefin polymerization according to claim 1, wherein the vinyl saturated cyclic hydrocarbon has 5 to 10 carbon atoms.

6. The method for producing a catalyst for olefin polymerization according to claim 1, wherein the Ziegler-Natta catalyst comprises transition metal compounds containing elements from Group IV, V or VI; and organic metal compounds containing elements from Group XIII of the periodic table.

7. The method for producing a catalyst for olefin polymerization according to claim 6, wherein a molar ratio of the organic metal compound to the transition metal compound is 5 to 50.

8. The method for producing a catalyst for olefin polymerization according to claim 6, wherein the transition metal compound comprises a solid titanium catalyst containing magnesium, titanium, halogen atoms and internal electron donors.

9. The method for producing a catalyst for olefin polymerization according to claim 8, wherein the internal electron donor comprises diether compounds, phthalate compounds, or mixtures thereof.

10. The method for producing a catalyst for olefin polymerization according to claim 6, wherein the organic metal compound comprises organic aluminum compounds.

11. A catalyst for olefin polymerization produced by the method for producing a catalyst for olefin polymerization of claim 1.

12. A process for polymerizing an olefin, comprising the steps of
  A) first prepolymerizing a Ziegler-Natta catalyst and α-olefin, and then second prepolymerizing the first prepolymerized Ziegler-Natta catalyst by adding vinyl saturated cyclic hydrocarbon without a washing step to produce a prepolymerized Ziegler-Natta catalyst; and
  B) polymerizing an olefin using the Ziegler-Natta catalyst prepolymerized in the step A).

13. The process for polymerizing an olefin according to claim 12, wherein in the step A), the prepolymerization is performed without any external electron donor.

14. The process for polymerizing an olefin according to claim 12, wherein in the step A), the prepolymerization is performed at less than 50° C.

15. The process for polymerizing an olefin according to claim 12, wherein in the step A), the feed rate of vinyl saturated cyclic hydrocarbon is (0.02 to 50 g of vinyl saturated cyclic hydrocarbon/gram of Ziegler-Natta catalyst)/hour.

16. The process for polymerizing an olefin according to claim 12, wherein the Ziegler-Natta catalyst comprises transition metal compounds containing elements from Group IV, V or VI; and organic metal compounds containing elements from Group XIII of the periodic table.

17. The process for polymerizing an olefin according to claim 16, wherein a molar ratio of the organic metal compound to the transition metal compound is 5 to 50.

18. The process for polymerizing an olefin according to claim 16, wherein the transition metal compound comprises a solid titanium catalyst containing magnesium, titanium, halogen atoms and internal electron donors.

19. The process for polymerizing an olefin according to claim 18, wherein the internal electron donor comprises diether compounds, phthalate compounds, or mixtures thereof.

20. The process for polymerizing an olefin according to claim 16, wherein the organic metal compound comprises organic aluminum compounds.

21. The process for polymerizing an olefin according to claim 12, wherein the vinyl saturated cyclic hydrocarbon has 5 to 10 carbon atoms.

22. The process for polymerizing an olefin according to claim 12, wherein in the step B), an external electron donor is added during the olefin polymerization.

23. The process for polymerizing an olefin according to claim 12, wherein the olefin is propylene.

24. The process for polymerizing an olefin according to claim 12, wherein in the step B), the prepolymerized Ziegler-Natta catalyst is in a slurry form.

* * * * *